(12) United States Patent
Xiao

(10) Patent No.: US 10,049,674 B2
(45) Date of Patent: Aug. 14, 2018

(54) METHOD AND APPARATUS FOR EVALUATING VOICE QUALITY

(71) Applicant: Huawei Technologies Co., Ltd., Shenzhen (CN)

(72) Inventor: Wei Xiao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 14/683,449

(22) Filed: Apr. 10, 2015

(65) Prior Publication Data

US 2015/0213798 A1    Jul. 30, 2015

Related U.S. Application Data

(63) Continuation of application No. PCT/CN2013/076353, filed on May 28, 2013.

(30) Foreign Application Priority Data

Oct. 12, 2012    (CN) .......................... 2012 1 0387204

(51) Int. Cl.
  *G10L 17/04*    (2013.01)
  *G10L 25/69*    (2013.01)
  (Continued)

(52) U.S. Cl.
  CPC .............. *G10L 17/04* (2013.01); *G10L 21/02* (2013.01); *G10L 25/60* (2013.01); *G10L 25/69* (2013.01)

(58) Field of Classification Search
  CPC ......... G10L 17/04; G10L 21/02; G10L 25/60; G10L 25/69
  See application file for complete search history.

(56) References Cited

U.S. PATENT DOCUMENTS 6,446,038 B1    9/2002  Bayya et al.
6,651,041 B1   11/2003  Juric
(Continued)

FOREIGN PATENT DOCUMENTS

CN      1315032 A     9/2001
CN    101218627 A     7/2008
CN    101727896 A     6/2010

OTHER PUBLICATIONS

Elhilali, M., et al., "A Spectro-temporal Modulation Index (STMI) for Assessment of Speech Intelligibility," Speech Communication 41, Oct. 2003, pp. 331-348.*

(Continued)

*Primary Examiner* — Angela A Armstrong
(74) *Attorney, Agent, or Firm* — Conley Rose, P.C.

(57) ABSTRACT

A method for evaluating voice quality includes performing human auditory modeling processing on a voice signal to obtain a first signal; performing variable resolution time-frequency analysis on the first signal to obtain a second signal; and performing, based on the second signal, feature extraction and analysis to obtain a voice quality evaluation result of the voice signal. According to the foregoing technical solutions, a problem that accuracy of a voice quality evaluation is not high can be solved. A voice quality evaluation result with relatively high accuracy is finally obtained by performing human auditory modeling processing, then converting a to-be-detected signal into a multi-resolution signal, further analyzing the time-frequency signal of variable resolution, extracting a feature corresponding to the signal, and performing further analysis.

16 Claims, 12 Drawing Sheets

(51) Int. Cl.
*G10L 21/02* (2013.01)
*G10L 25/60* (2013.01)

(56) References Cited

U.S. PATENT DOCUMENTS

| | | | |
|---|---|---|---|
| 2007/0011006 A1 | 1/2007 | Kim | |
| 2008/0004868 A1* | 1/2008 | Nongpiur | G10L 21/0364 704/207 |
| 2008/0147388 A1* | 6/2008 | Singh | G10L 15/1822 704/226 |
| 2011/0153313 A1 | 6/2011 | Etter | |
| 2013/0046546 A1* | 2/2013 | Uhle | G10L 21/00 704/500 |

OTHER PUBLICATIONS

Tufecki et al, "Feature Extraction Using Discrete Wavelet Transform for Speech Recognition," Proceedings of IEEE Southeastcon 2000, Apr. 2000, pp. 116-123.*

Partial English Translation and Abstract of Chinese Patent Application No. CN101727896A, Mar. 30, 2015, 4 pages.

Kim, D., et al., "Anique+: A New American National Standard for Non-Intrusive Estimation of Narrowband Speech Quality," Bell Labs Technical Journal, vol. 12, No. 1, 2007, 16 pages.

Malfait, L., et al., "P.563—The ITU-T Standard for Single-Ended Speech Quality Assessment," IEEE Transactions on Audio, Speech, and Language Processing, vol. 14, No. 6, Nov. 2006, pp. 1924-1934.

"Series P: Telephone Transmission Quality, Telephone Installations, Local Line Networks, Objective Measuring Apparatus, Single-ended method for objective speech quality assessment in narrow-band telephony applications," ITU-T, p. 563, May 2004, 66 pages.

"Series P: Telephone Transmission Quality Methods for Objective and Subjective Assessment of Quality, Methods for subjective determination of transmission quality," ITU-T, p. 800, Aug. 1996, 37 pages.

Foreign Communication From a Counterpart Application, PCT Application No. PCT/CN2013/076353, English Translation of International Search Report dated Sep. 5, 2013, 2 pages.

Foreign Communication From a Counterpart Application, PCT Application No. PCT/CN2013/076353, English Translation of Written Opinion dated Sep. 5, 2013, 12 pages.

Kim, D., et al., "Perceptual Model for Non-Intrusive Speech Quality Assessment," Proceedings on Acoustics, Speech, and Signal Processing, vol. 3, May 17, 2004, pp. 1060-1063.

Polikar, R., "Multiresolution Analysis: The Discrete Wavelet Transform," The Wavelet Tutorial Part IV, Nov. 16, 2008, 8 pages.

Foreign Communication From a Counterpart Application, European Application No. 13845251.1, Extended European Search Report dated Jul. 6, 2015, 7 pages.

* cited by examiner

METHOD AND APPARATUS FOR EVALUATING VOICE QUALITY

CROSS-REFERENCE TO RELATED APPLICATIONS

This application is a continuation of International Application No. PCT/CN2013/076353, filed on May 28, 2013, which claims priority to Chinese Patent Application No. 201210387204.6, filed on Oct. 12, 2012, both of which are hereby incorporated by reference in their entireties.

TECHNICAL FIELD

The present invention relates to the field of audio technologies, and in particular, to a method and an apparatus for evaluating voice quality.

BACKGROUND

Subjective testing plays an important role in the research field of audio technologies. According to industry standards (for example, International Telecommunications Union-Telecommunications Standardization Sector (ITU-T) P.800), several testers are organized to listen to and test a series of audio sequences, and then statistics on an average trend of quality graded by the testers are collected, which are generally represented by Mean Opinion Score (MOS). A score reflects quality of related audio technology.

However, subjective testing has disadvantages of a long experimental period and high economic costs; and it is impractical to organize subjective tests in large quantities in a middle phase of an audio algorithm research. Therefore, it has a significant meaning to study an objective testing tool. From the perspective of methodology, by using methods such as mathematics and signal processing, an objective testing tool abstracts a scoring system and outputs a quality evaluation result, and correspondingly, an output is represented by MOS-Listening Quality Objective (MOS-LQO).

Up to now, many objective evaluation tools have emerged in the industry. Objective quality evaluation tools may be simply classified into two categories: intrusive and non-intrusive. Generally, in an existing network, a reference signal is hard to obtain due to various constraints. Therefore, a non-intrusive model is increasingly demanded and is more technically challenging.

A modeling method of the non-intrusive signal domain model ITU-T P.563 in the prior art is based on an oral phonation mechanism, but a so-called voice quality evaluation is a perception process of an auditory system, which sharply differs from the foregoing oral phonation mechanism. In addition, the oral phonation mechanism generally involves a large quantity of assumptions and simplification, and there is inaccuracy in a universal application. Therefore, accuracy of a voice quality evaluation determined by using the non-intrusive signal domain model is not high.

SUMMARY

In view of this, embodiments of the present invention provide a method and an apparatus for evaluating voice quality, so as to solve a problem that accuracy of a voice quality evaluation is not high.

According to a first aspect, a method for evaluating voice quality is provided, including performing human auditory modeling processing on a voice signal to obtain a first signal; performing variable resolution time-frequency analysis on the first signal to obtain a second signal; and performing, based on the second signal, feature extraction and analysis to obtain a voice quality evaluation result of the voice signal.

In a first possible implementation manner, the voice signal is made pass through a band-pass filter bank that conforms to a human auditory feature, to acquire N sub-band signals, where N is the number of band-pass filter channels and is a positive integer; and a temporal envelope of each sub-band signal is calculated to obtain the first signal.

With reference to the first aspect or the first possible implementation manner of the first aspect, in a second possible implementation manner, L-order discrete wavelet transform is performed on each first signal, and M wavelet signals are selected, from wavelet signals obtained by means of the L-order discrete wavelet transform, as the second signal, where L and M are are a positive integer, a value of L is determined based on a sampling rate of the voice signal and a frequency resolution that is required for quality evaluation and analysis, and a value of M is determined according to L and a frequency analysis range that is set during the quality evaluation and analysis.

With reference to the second possible implementation manner of the first aspect, in a third possible implementation manner, when the sampling rate of the voice signal is 16 kilohertz (KHz), the frequency resolution is from 0 to 15.625 hertz (Hz), and the set frequency analysis range is from 0 to 500 Hz, 9-order discrete wavelet transform is performed on each first signal, and six wavelet signals are selected, from wavelet signals obtained from each first signal, as the second signal; or when the sampling rate of the voice signal is 8 KHz, the frequency resolution is from 0 to 15.625 Hz, and the set frequency analysis range is from 0 to 250 Hz, 8-order discrete wavelet transform is performed on each first signal, and five wavelet signals are selected, from wavelet signals obtained from each first signal, as the second signal. With reference to the third possible implementation manner of the first aspect, in a fourth possible implementation manner, after M*N wavelet signals of the N sub-band signals are obtained, all or multiple wavelet signals are selected from the M*N wavelet signals for feature extraction and analysis, where N is a positive integer.

With reference to the fourth possible implementation manner of the first aspect, in a fifth possible implementation manner, when N=30, and multiple wavelet signals are selected from the M*N wavelet signals for feature extraction and analysis, the multiple wavelet signals are the following wavelet signals of a $K^{th}$ sub-band of the following N sub-bands: when k<=16, four wavelet signals with a maximum frequency range of 125 Hz are selected; when 17<=k<=20, five wavelet signals with a maximum frequency range of 250 Hz are selected; and when 21<=k<=30, all six wavelet signals with a maximum frequency range of 500 Hz are selected.

With reference to the fourth possible implementation manner of the first aspect, in a sixth possible implementation manner, when N=18, and multiple wavelet signals are selected from the M*N wavelet signals for feature extraction and analysis, the multiple wavelet signals are the following wavelet signals of a $K^{th}$ sub-band of the following N sub-bands: when k<=16, four wavelet signals with a maximum frequency range of 125 Hz are selected; and when 17<=k<=18, five wavelet signals with a maximum frequency range of 250 Hz are selected.

With reference to the first aspect or any one of the foregoing possible implementation manners of the first aspect, in a seventh possible implementation manner, an average energy of each wavelet signal in the second signal is calculated and the average energy is used as a feature; and all features are combined into a multi-dimensional feature vector, and the voice quality evaluation result of the voice signal is obtained after distortion detection and quality prediction are performed on the feature vector.

With reference to the seventh possible implementation manner of the first aspect, in an eighth possible implementation manner, an average value of the voice quality evaluation result of the voice signal and at least one voice quality evaluation result of a previous voice signal is calculated to obtain a comprehensive voice quality evaluation result.

With reference to the first aspect or any one of the foregoing possible implementation manners of the first aspect, in a ninth possible implementation manner, resampling processing is performed on a voice signal of various sampling rates to obtain the voice signal of a same sampling rate.

According to a second aspect, an apparatus for evaluating voice quality is provided, including a first acquiring unit, a second acquiring unit, and a feature extraction and analysis unit, where the first acquiring unit is configured to perform human auditory modeling processing on a voice signal to obtain a first signal, and send the first signal to the second acquiring unit; the second acquiring unit is configured to receive the first signal sent by the first acquiring unit, perform variable resolution time-frequency analysis on the first signal to obtain a second signal, and send the second signal to the feature extraction and analysis unit; and the feature extraction and analysis unit is configured to receive the second signal sent by the second acquiring unit, and perform, based on the second signal, feature extraction and analysis to acquire a voice quality evaluation result of the voice signal.

In a first possible implementation manner, the first acquiring unit includes a filter bank and a temporal envelope module, where the filtering module is configured to make the voice signal pass through a band-pass filter bank that conforms to a human auditory feature, to acquire N sub-band signals, and send the N sub-band signals to the temporal envelope module, where N is the number of band-pass filter channels and is a positive integer; and the temporal envelope module is configured to receive the N sub-band signals sent by the filtering module, and calculate a temporal envelope of each sub-band signal to obtain the first signal.

With reference to the second aspect or the first possible implementation manner of the second aspect, in a second possible implementation manner, the second acquiring unit is configured to perform L-order discrete wavelet transform on each first signal, and select, from wavelet signals obtained by means of the L-order discrete wavelet transform, M wavelet signals as the second signal, where L and M are each a positive integer, a value of L is determined based on a sampling rate of the voice signal and a frequency resolution that is required for quality evaluation and analysis, and a value of M is determined according to L and a frequency analysis range that is set during the quality evaluation and analysis.

With reference to the second possible implementation manner of the second aspect, in a third possible implementation manner, the second acquiring unit is configured to, when the sampling rate of the voice signal is 16 KHz, the frequency resolution is from 0 to 15.625 Hz, and the set frequency analysis range is from 0 to 500 Hz, perform 9-order discrete wavelet transform on each first signal, and select, from wavelet signals obtained from each first signal, six wavelet signals as the second signal; or when the sampling rate of the voice signal is 8 KHz, the frequency resolution is from 0 to 15.625 Hz, and the set frequency analysis range is from 0 to 250 Hz, perform 8-order discrete wavelet transform on each first signal, and select, from wavelet signals obtained from each first signal, five wavelet signals as the second signal.

With reference to the third possible implementation manner of the second aspect, in a fourth possible implementation manner, the feature extraction and analysis unit includes a selecting module, where the selecting module is configured to, after M*N wavelet signals of the N sub-band signals are obtained, select all or multiple wavelet signals from the M*N wavelet signals for feature extraction and analysis, where N is a positive integer.

With reference to the fourth possible implementation manner of the second aspect, in a fifth possible implementation manner, when N=30, the selecting module is configured to select the following multiple wavelet signals: when $k<=16$, select four wavelet signals with a maximum frequency range of 125 Hz; and when $17<=k<=20$, select five wavelet signals with a maximum frequency range of 250 Hz; and when $21<=k<=30$, select all six wavelet signals with a maximum frequency range of 500 Hz.

With reference to the fourth possible implementation manner of the second aspect, in a sixth possible implementation manner, when N=18, the selecting module is configured to select the following multiple wavelet signals: when $k<=16$, select four wavelet signals with a maximum frequency range of 125 Hz; and when $17<=k<=18$, select five wavelet signals with a maximum frequency range of 250 Hz.

With reference to the second aspect or any one of the foregoing possible implementation manners of the second aspect, in a seventh possible implementation manner, the feature extraction and analysis unit further includes a feature module and an evaluation module, where the feature module is configured to calculate an average energy of each wavelet signal in the second signal and use the average energy as a feature, and send the feature to an evaluation module; and the evaluation module is configured to receive the feature sent by the feature module, combine all features into a multi-dimensional feature vector, and obtain the voice quality evaluation result of the voice signal after distortion detection and quality prediction are performed on the feature vector.

With reference to the seventh possible implementation manner of the second aspect, in an eighth possible implementation manner, the evaluation module is further configured to calculate an average value of the voice quality evaluation result of the voice signal and at least one voice quality evaluation result of a previous voice signal, to obtain a comprehensive voice quality evaluation result.

With reference to the second aspect or any one of the foregoing possible implementation manners of the second aspect, in a ninth possible implementation manner, the apparatus further includes a resampling unit, where the resampling unit is configured to perform resampling processing on a voice signal of various sampling rates to obtain the voice signal of a same sampling rate.

According to the foregoing technical solutions, a voice quality evaluation result with relatively high accuracy is finally obtained by performing human-ear filter bank processing, then converting a to-be-detected signal into a multi-resolution signal, further analyzing the multi-resolution signal, extracting a feature corresponding to the signal, and performing further analysis.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
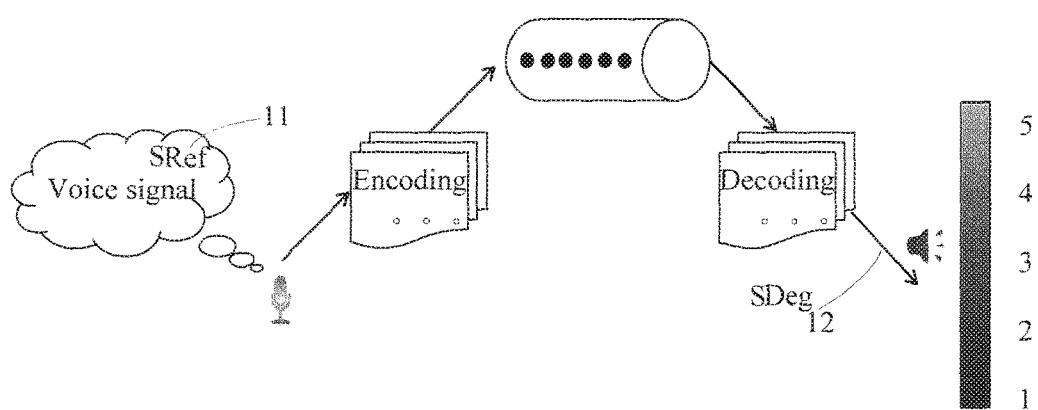
FIG. 1 is a schematic diagram of a voice communication procedure in the prior art.

FIG. 1 is a schematic diagram of a voice communication procedure in the prior art.

At a calling party, a signal before encoding is defined as a reference signal ($S_{Ref}$) 11. When negative effects of encoding and subsequent transmission on voice quality are considered, the $S_{Ref}$ generally has optimal quality in an entire procedure. Accordingly, a decoded signal is defined as a received signal ($S_{Deg}$) 12, and generally, the $S_{Deg}$ is inferior to the $S_{Ref}$ in quality. According to analysis from the $S_{Ref}$ to the $S_{Deg}$, main reasons for quality reduction include encoding and transmission.

Figure 2:
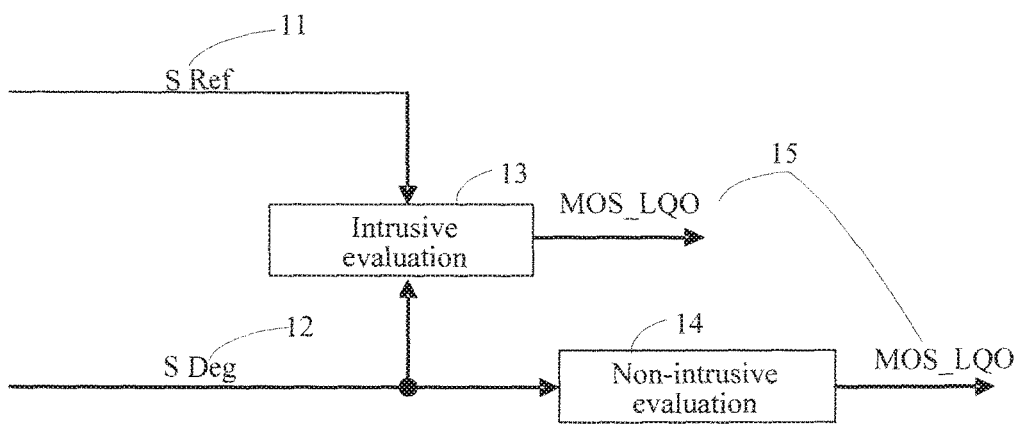
FIG. 2 is a schematic block diagram of a voice evaluation model in the prior art.

FIG. 2 is a schematic block diagram of a voice evaluation model in the prior art.

In an intrusive evaluation model, an intrusive evaluation 13 is performed according to an $S_{Ref}$ 11 and an $S_{Deg}$ 12 to output a voice quality evaluation result 15, that is, MOS-LQO.

In a non-intrusive evaluation model, a non-intrusive evaluation 14 is performed according to an $S_{Deg}$ 12 to output a voice quality evaluation result 15, that is, MOS-LQO.

In the non-intrusive evaluation model, the model may further be classified into two categories: a parameter domain model and a signal domain model. The signal domain model is easy to understand, that is, a quality evaluation is directly performed on a collected $S_{Deg}$ to obtain a MOS score to reflect quality. This modeling method is equivalent to that a model that conforms to a human auditory system is designed to perform a quality evaluation by using a method such as signal processing. On the other hand, a modeling method of the parameter domain model is totally different. Since encoding and transmission are main reasons for quality reduction, several physical indexes that reflect encoding and transmission are extracted and trained, so as to obtain a mathematical expression; and a MOS score is predicted by using the mathematical expression, to reflect quality. A typical parameter domain model is the ITU-T G.107 (commonly known as e-model). The physical indexes include but are not limited to an encoder, an encoding rate, a network packet loss rate, a network delay, and the like. Generally, the signal domain model is created based on a human auditory system, which is closer to reality and more accurate; accordingly, the signal domain model involves a great amount of signal processing and other calculation; therefore, it is much more complex than the parameter domain model.

The present invention relates to a non-intrusive signal domain model, but a difference from the non-intrusive signal domain model ITU-T P.563 in a working principle is that, in the present invention, a model is created according to human auditory perception, and an obtained voice quality evaluation is more accurate. Typical application scenarios include voice quality detection on a terminal side and a network side.

According to a technology involved in the embodiments of the present invention, subjective experience of a person is predicted mainly by analyzing a voice signal. In an application scenario, for example, an apparatus that uses the technical solutions in the embodiments of the present invention is built in a mobile phone or a mobile phone uses the technical solutions in the embodiments of the present invention to perform an evaluation on voice quality of a call. For a mobile phone on one side of a call, after receiving a bitstream, the mobile phone may reconstruct a voice file by decoding, the voice file is used as an input voice signal in the embodiments of the present invention, and quality of a received voice may be obtained, where the voice quality basically reflects quality of a voice that a user actually hears. Therefore, by using the technical solutions involved in the embodiments of the present invention in a mobile phone, a subjective feeling of a person can be effectively evaluated.

In addition, generally, voice data needs to pass through several nodes in a network before the voice data is transmitted to a receiving party. Because of impact of some factors, after the voice data is transmitted over the network, voice quality probably degrades. Therefore, it has a great significance to detect voice quality on each node on a network side. However, many existing methods reflect more about quality of a transmission layer, which does not correspond to a true feeling of a person in a one-to-one manner. Therefore, it may be considered that the technical solutions in the embodiments of the present invention are applied to each network node to synchronously perform quality prediction so as to find a quality bottleneck. For example, for any network result, a specific decoder is selected by analyzing a bitstream to perform local decoding on the bitstream to reconstruct a voice file; voice quality on the node may be obtained by using the voice file as an input voice signal in the embodiments of the present invention; and a node that needs to be improved in quality may be located by comparing voice quality on different nodes. Therefore, this application may play an important supporting role in operator's network optimization.

Figure 3:
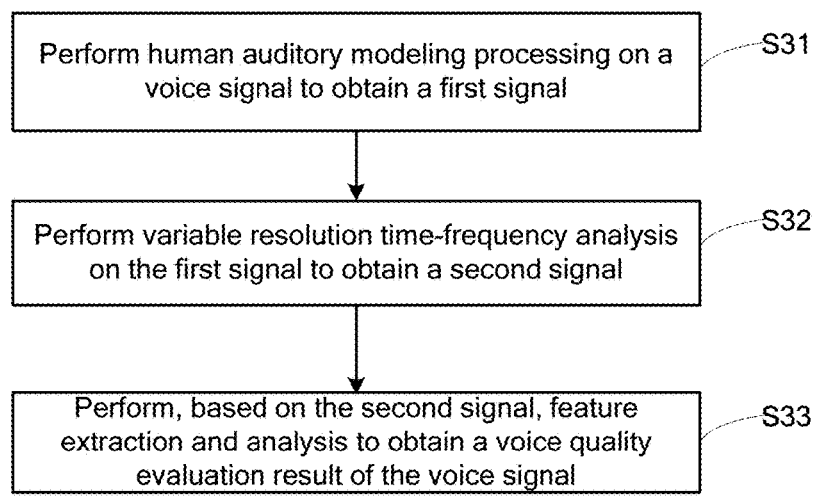
FIG. 3 is a schematic flowchart of a method for evaluating voice quality according to Embodiment 1 of the present invention.

FIG. 3 is a schematic flowchart of a method for evaluating voice quality according to Embodiment 1 of the present invention.

S31. Perform human auditory modeling processing on a voice signal to obtain a first signal.

Generally, voice quality is evaluated in real time, and a voice quality evaluation procedure is performed each time after a voice signal is received in a time segment. The voice signal herein may be evaluated in a unit of frame, that is, a voice quality evaluation procedure is performed after a voice signal frame is received. The voice signal frame herein represents a voice signal with certain duration, and the duration may be set according to a requirement of a user.

A human auditory system is selective about a frequency range of a voice. Therefore, it is more efficient to separately analyze signals within different frequency ranges. Generally, human auditory modeling processing is introduced to implement the foregoing procedure. The human auditory modeling processing in this specification means that by means of decomposition, multiple sub-band signals that conform to a human auditory feature are obtained from a voice signal, and a feature of each sub-band is calculated, so as to obtain a first signal.

S32. Perform variable resolution time-frequency analysis on the first signal to obtain a second signal.

For example, a male voice and a female voice may be roughly distinguished by means of frequency domain analysis. In addition, some features have certain continuity in terms of time, or some special signals, for example, a sudden unnatural pause, occurs only in a moment.

Therefore, from a more proper perspective, if a model is created based on auditory perception, it is better to use a method in which both a time domain and a frequency domain are considered, so as to better conform to an actual auditory perception procedure. The variable resolution time-frequency analysis used herein highlights that a response made in a brain auditory system at a particular moment when a voice is heard by a human ear should be a result of both time-domain information and frequency-domain information.

S33. Perform, based on the second signal, feature extraction and analysis to obtain a voice quality evaluation result of the voice signal.

Because the second signal in the foregoing step is time-frequency information, a corresponding feature is extracted based on a time-frequency representation method, and then the voice quality evaluation result is obtained.

In another embodiment, the method for evaluating voice quality further includes the following.

An average value of the voice quality evaluation result of the voice signal and at least one voice quality evaluation result of a historical voice signal is calculated to obtain a comprehensive voice quality evaluation result, where the historical voice signal is a voice signal prior to the voice signal, and each historical voice signal has the same duration as the voice signal.

Generally, voice quality is evaluated in real time, and a voice quality evaluation procedure is performed each time after a voice signal is received in a time segment. A voice quality evaluation result of a voice signal in a current time segment may be considered as a short-time voice quality evaluation result; a result that is obtained by calculating an average value of the voice quality evaluation result of the voice signal and at least one voice quality evaluation result of a historical voice signal and in which various voice quality evaluation results within a period of time are considered may be considered as a comprehensive voice quality evaluation result or a long-time voice quality evaluation result.

According to the method for evaluating voice quality provided in this embodiment of the present invention, a voice quality evaluation result with relatively high accuracy is finally obtained by performing human auditory modeling processing, then converting a to-be-detected signal into a multi-resolution signal, further analyzing the multi-resolution signal, extracting a feature corresponding to the signal, and performing further analysis.

Figure 4A:
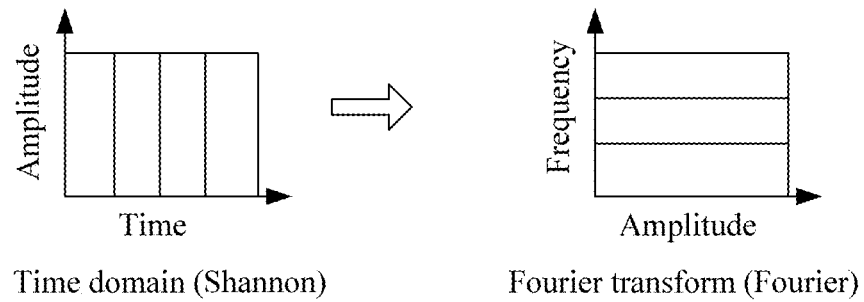
FIG. 4A to FIG. 4C are schematic diagrams of three signal processing tools in the prior art.
Figure 4B:
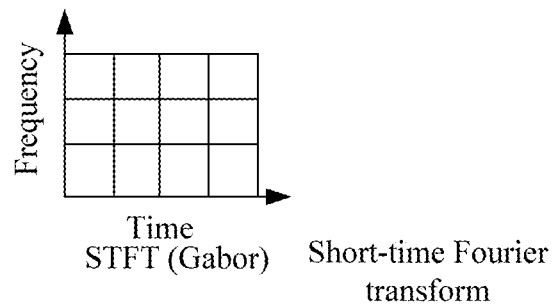
Figure 4C:
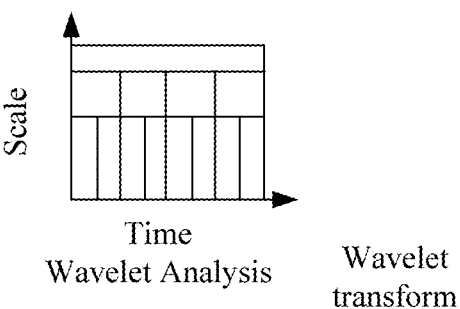

FIG. 4A to FIG. 4C are schematic diagrams of three signal processing tools in the prior art. FIG. 4A shows Fourier transform, FIG. 4B shows short-time Fourier transform, and FIG. 4C shows wavelet transform.

According to the Heisenberg uncertainty principle, when signal analysis is performed, high time resolution and high frequency resolution cannot be obtained simultaneously but only to reach a compromise. In a practical application, a signal is generally processed after being cut (by adding a time window). When the time window is relatively narrow, the time resolution is high and the frequency resolution is low; and when the time window is relatively wide, the time resolution is low and the frequency resolution is high.

However, in a practical application, adaptive resolution is a very important requirement. For example, in voice communication, feature variations of signals show diversity. A stable voiced signal requires high frequency resolution for detailed analysis; and a large-energy mutation signal occurs in a moment and requires high time resolution for detailed analysis.

The Fourier transform is a most typical tool for signal processing. During the Fourier transform, a time-domain signal is mapped to a frequency domain for analysis; however, time resolution of the Fourier transform is invariable, and a mutation signal cannot be accurately located. Briefly, the Fourier transform is an only frequency-domain processing method.

The short-time Fourier transform is introduced, and the essence of the short-time Fourier transform is to add a time window (generally, a relatively short time span) is added before the Fourier transform is performed. When a requirement of time resolution of a mutation signal is determined, short-time Fourier transform that has a proper length is selected, so that a satisfactory effect can be achieved. However, once a window length of the short-time Fourier transform is determined, it cannot be changed, which lacks adaptability and variability.

Figure 5A:
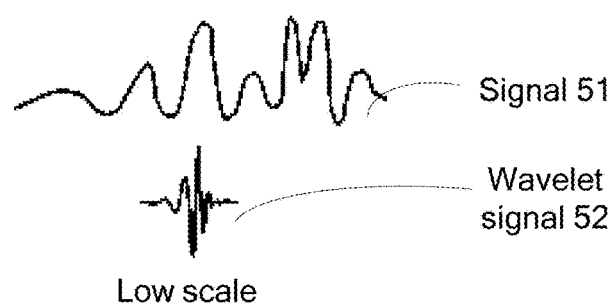
FIG. 5A and FIG. 5B show a relationship between scales and time-frequency resolution during wavelet transform.
Figure 5B:
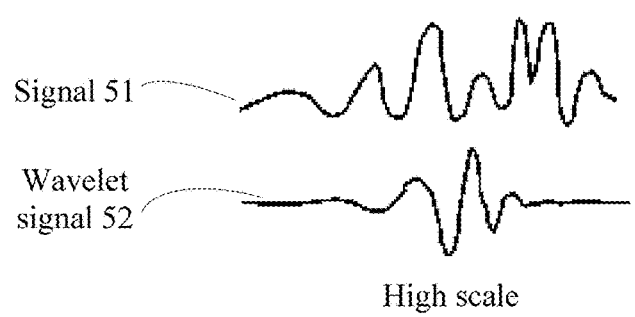

During the wavelet transform, time-frequency resolution may be determined by setting a scale. Each scale corresponds to a compromise of time-frequency resolution to be determined. Therefore, by changing the scale, proper time-frequency resolution may be adaptively obtained, that is, according to an actual situation, a proper compromise can be obtained between time resolution and frequency resolution, so as to perform other subsequent processing. Reference is made to FIG. 5A and FIG. 5B.

FIG. 5A and FIG. 5B show a relationship between scales and time-frequency resolution during wavelet transform. It can be learned from FIG. 5A that a same signal 51 selects low-scale time-frequency resolution, and a wavelet signal 52 is compressed and may be used to reflect details of fast transform. It can be learned from FIG. 5B that a same signal 51 selects high-scale time-frequency resolution, and a wavelet signal 52 is extended and may be used to reflect a low-speed variation such as a roughness feature.

By analysis of FIG. 5A and FIG. 5B, a feature, in which both a time domain and a frequency domain are considered, of the wavelet transform is creatively used in a method for evaluating voice quality, which conforms to an auditory perception procedure and improves accuracy of a voice quality evaluation.

Figure 6A:
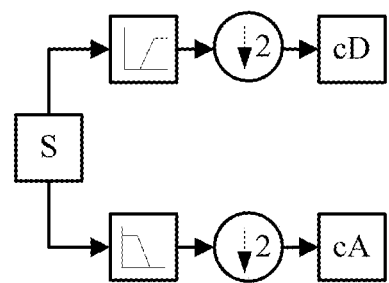
FIG. 6A and FIG. 6B show signal representation of wavelet classification and a wavelet tree respectively.
Figure 6B:
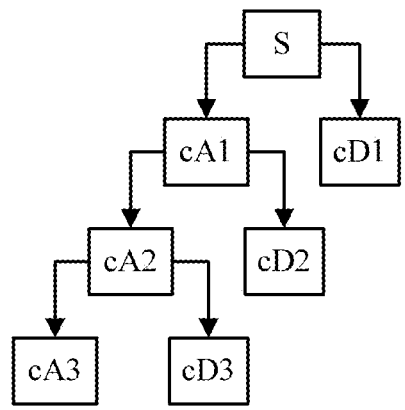

In a practical computer application, time-frequency resolution is repeatedly adjusted by using an iterative method (for example, iteration is performed on a scale according to a $2^n$ relationship), until satisfaction is gained. This is variable resolution time-frequency analysis. FIG. 6A and FIG. 6B show signal representation of wavelet classification and a wavelet tree respectively. FIG. 6A shows signal representation of wavelet classification. In a wavelet application, the time-frequency signal of the variable resolution may be represented by a so-called wavelet tree. Reference is made to FIG. 6B.

In a wavelet tree, each node may be decomposed into a component of a next scale by using a same quadrature mirror filter (QMF) filter bank (including a low-pass filter L and a high-pass filter H). For example, an input is S, and after S is decomposed by using the QMF, an estimated part (after low-pass filtering) cA1 and a detail part cD1 (after high-pass filtering) are obtained. In a same manner, cA1 may be further decomposed into cA2 and cD2. Therefore, by means of the foregoing iterative procedure, a signal of any time-resolution may be adaptively obtained, where the signal includes information about time and frequency corresponding to a current scale and may be used to analyze time information and frequency information corresponding to this scale.

According to the foregoing description, the present invention proposes a non-intrusive signal-domain quality evaluation system based on time-frequency analysis. Wavelet transform is performed on a signal that passes through an acoustic system model, to obtain a series of wavelet signals. Corresponding features are extracted from the wavelet signals, and the extracted features are combined into a multi-dimensional vector, which is also called as a feature. Calculation is further performed on the multi-dimensional vector to obtain a voice quality evaluation result.

Figure 7:
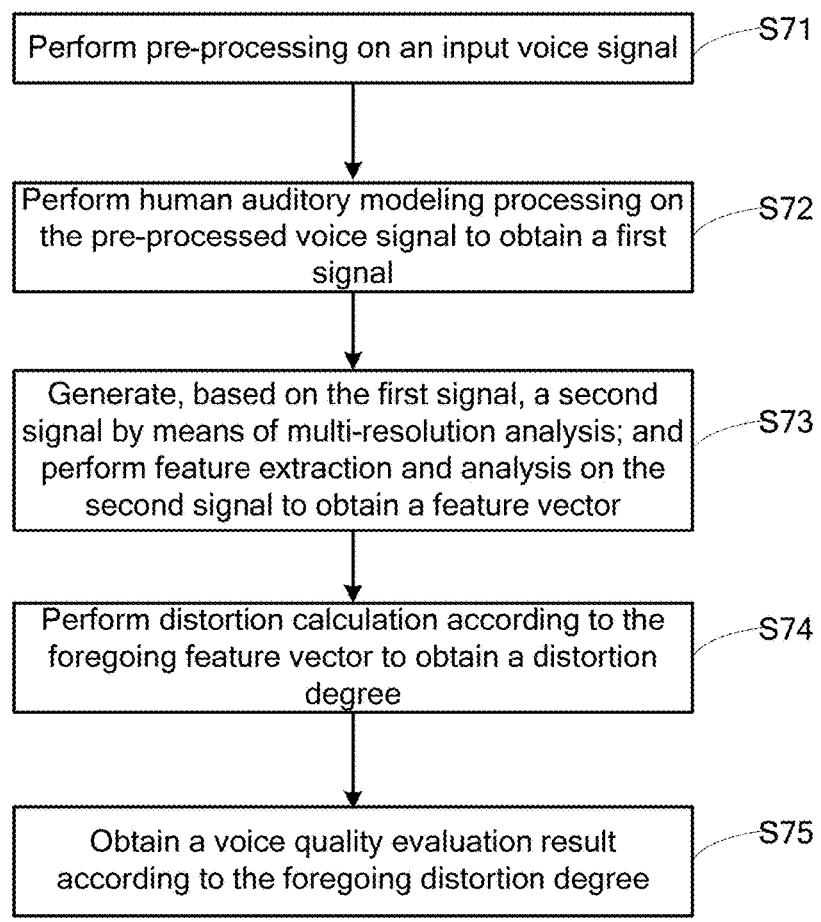
FIG. 7 is a schematic flowchart of a method for evaluating voice quality according to Embodiment 2 of the present invention.

FIG. 7 is a schematic flowchart of a method for evaluating voice quality according to Embodiment 2 of the present invention, where the method includes the following content.

S71. Perform pre-processing on an input voice signal.

Pre-processing is a well-known technology, and the pre-processing process may include but is not limited to performing normalization on the voice signal. This step is an optional step.

S72. Perform human auditory modeling processing on the pre-processed voice signal to obtain a first signal.

Figure 8:
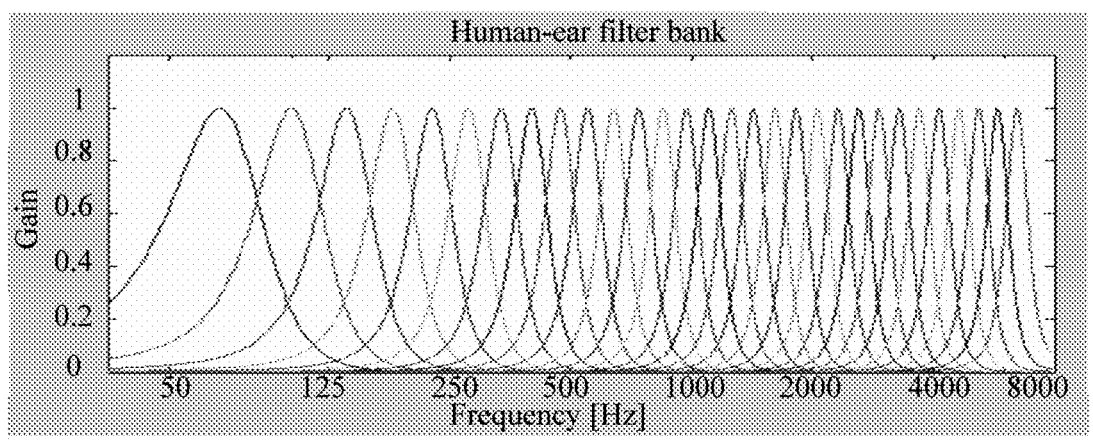
FIG. 8 is a schematic diagram of a signal that has a sampling rate of 16 KHz and on which band-pass filtering is performed by a human-ear filter bank according to Embodiment 3 of the present invention.

In an embodiment, the human auditory modeling processing includes making the voice signal pass through a band-pass filter bank that conforms to a human auditory feature, to acquire N (N is a positive integer) sub-band signals by means of decomposition, where N is equal to the number of band-pass filter channels; and calculating a temporal envelope of each sub-band signal as the first signal. FIG. 8 is a schematic diagram of a signal that has a sampling rate of 16 KHz and on which band-pass filtering is performed by a human-ear filter bank according to Embodiment 3 of the present invention. According to related psychoacoustic research, speech intelligibility is a most crucial factor for reflecting voice quality; a temporal envelope can reflect related information about the speech intelligibility; and in an embodiment, a temporal envelope of each sub-band signal is calculated as the first signal. Certainly, as another embodiment, each sub-band signal may be directly analyzed to obtain the first signal.

A human ear filter may be used to acquire a sub-band signal by means of decomposition. The human-ear filter bank is a special band-pass filter bank, which performs non-uniform band division for a voice signal. Therefore, after an input voice signal is processed by the human ear filter, sub-band signals within different frequency ranges may be output, and the foregoing sub-band signals may be further processed to obtain the first signal. The human-ear filter bank may be implemented in different manners by using digital filters, for example, a Gammaton filter bank may be used.

S73. Generate, based on the first signal, a second signal by means of time-frequency signal of the variable resolution; and perform feature extraction and analysis on the second signal to obtain a feature vector.

L-order discrete wavelet transform is performed on each temporal envelope of the N sub-band signals, and M (M is a positive integer) wavelet signals are selected, from wavelet signals obtained by means of the L-order discrete wavelet transform, as the second signal. L is the number of decomposition levels of the wavelet transform, which depends on a sampling rate of the input voice signal and a frequency resolution that is required for quality evaluation and analysis. The required frequency resolution is a requirement for precision of frequency resolution. M is the number of wavelet signals selected from each band-pass filter channel, and a value of M may be determined according to L and a frequency analysis range that is set during the quality evaluation and analysis.

After the wavelet transform, all wavelet signals, that is, M*N wavelet signals may be used; or a part of all the wavelet signals may be selected for subsequent feature extraction and analysis. A difference between the two is that more wavelet signals that are involved in the processing indicate more complex calculation.

An average energy of each wavelet signal in the second signal is calculated and the average energy is used as a feature. Finally, all features are combined into a multi-dimensional feature vector.

For different values of N, L, and M, a voice quality evaluation of a voice signal of multiple sampling rates may be supported in this embodiment of the present invention, which provides flexibility for a quality evaluation of a voice signal of an increasing sampling rate in the future. In the following, a voice signal of a 16 KHz sampling rate and a voice signal of an 8 KHz sampling rate are used as an example to describe the method for evaluating voice quality in this embodiment of the present invention.

The following describes Embodiment 3 of the present invention, where a sampling rate of a voice signal is 16 KHz.

For a voice signal of which a sampling rate is 16 KHz, a filter bank that has 30 sub-bands may be defined in step S72.

Therefore, an input signal may be divided into 30 sub-band signals; in this case, N=30. N may be changed as required, for example, if a signal is to be processed more precisely without considering complexity, a human-ear filter bank with N being 60 may also be designed. Therefore, that N is chosen to be 30 is only an example, and 30 is a preferred value in this embodiment of the present invention.

For a sub-band signal $s_k(n)$ of a $k^{th}$ sub-band, a temporal envelope corresponding to the sub-band signal is calculated to acquire a corresponding first signal:

$$\varphi_k(n) = \sqrt{s_k^2(n) + \tilde{s}_k^2(n)}, k = 1, 2, \ldots, 30 \quad \text{(Formula 1)}$$

where $\tilde{s}_k(n)$ is Hilbert transform of $s_k(n)$.

Figure 9A:
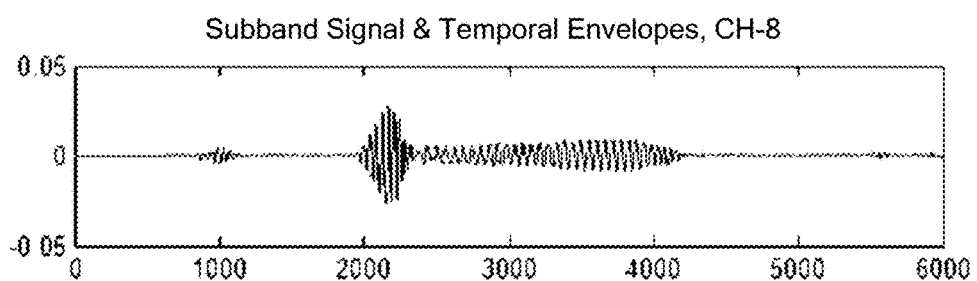
FIG. 9A to FIG. 9B are oscillograms of a signal whose voice signal is on an eighth sub-band and a corresponding temporal envelope respectively.
Figure 9B:
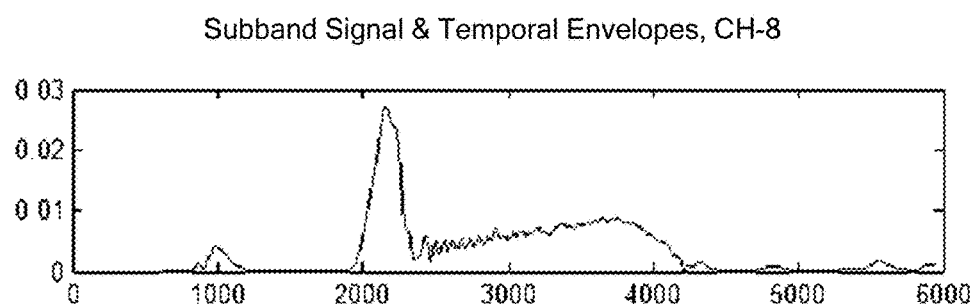

FIG. 9A to FIG. 9B are respectively oscillograms of a signal whose voice signal is on an eighth sub-band and a corresponding temporal envelope.

A reason for choosing a temporal envelope in this embodiment of the present invention is that reference is made to a research conclusion in a related psychoacoustic aspect. For voice quality, speech intelligibility is a most important factor, and a temporal envelope may be used to describe the speech intelligibility.

For a temporal envelope $\varphi_k(n)$ of a $k^{th}$ sub-band, a wavelet signal of the temporal envelope is extracted. According to the foregoing description, during discrete wavelet transform, decomposition may be performed level by level by using an iterative QMF filter bank. After each decomposition, two obtained sub-signals are an estimated part and a detail part, and each part occupies 50% of a bandwidth.

Figure 10A:
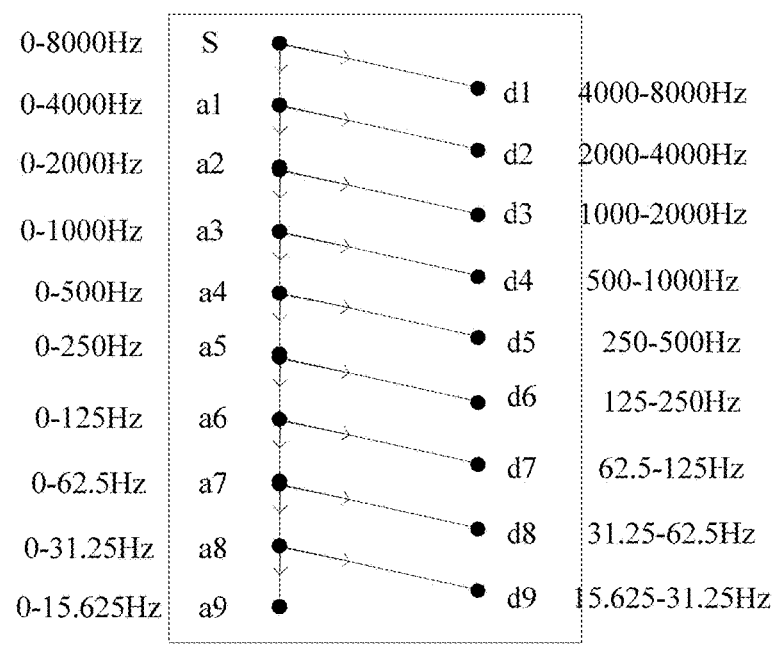
FIG. 10A and FIG. 10B respectively show schematic band-pass ranges of discrete wavelet transform for a voice signal that is sampled at 16 KHz and a voice signal that is sampled at 8 KHz.

FIG. 10A shows a schematic band-pass range of discrete wavelet transform for a voice signal that is sampled at 16 KHz. A range of a voice signal before band-pass filtering is from 0 to 8000 Hz. When a sampling rate of a voice signal is 16 KHz and a required frequency resolution is from 0 to 15.625 Hz, it is determined that L is 9. A frequency resolution required in this embodiment of the present invention is set to 0 to 15.625 Hz. It can be learned from FIG. 10A that a wavelet signal within a range of 0 to 15.625 Hz may be precisely obtained by means of 9-level decomposition. By analogy, wavelet signals within frequency ranges of 15.625 to 31.25, 62.5 to 125 Hz, and the like may be obtained. According to related psychoacoustic analysis, preferably, a frequency analysis range that is set in quality evaluation and analysis is set to 0 to 500 Hz. Only a wavelet signal with a maximum frequency range of 500 Hz is collected, and it can be learned from FIG. 10A that there are six wavelet signals in total, such as a9, d9, d8, d7, d6, and d5. In this case, M=6. For a $k^{th}$ sub-band, wavelet functions corresponding to a9, d9, d8, d7, d6, and d5 are named as $w_k^{(1)}(n)$, $w_k^{(2)}(n)$, $w_k^{(3)}(n)$, $w_k^{(4)}(n)$, $w_k^{(5)}(n)$, and $w_k^{(6)}(n)$ respectively. For 30 sub-bands and 180 wavelet signals in total, the foregoing wavelet signals are a second signal.

For a wavelet signal on the $k^{th}$ sub-band $W_k^{(i)}(n)$, k=1, 2, ... 30, i={1, 2, ... 6}, an average energy $P_k(i)$ of the wavelet signal is calculated:

$$P_k(i) = 10 * \log_{10}\left(\frac{\sum_{i=1}^{t}(w_k^{(i)}(n))^2}{t}\right) \quad \text{(Formula 2)}$$

where t is the total number of samples included in any wavelet signal.

Feature extraction may be performed based on the foregoing 180 wavelet signals, where the feature is an average energy of each wavelet signal, so that a 180-dimensional feature vector is obtained and is used for subsequent steps to acquire a voice quality evaluation result. However, in a practical application, the foregoing procedures are optimized in this embodiment of the present invention with reference to the following two aspects, and only a part of all the wavelet signals are selected.

Referring to FIG. 8, for a low sub-band, for example a sub-band 1, a bandwidth of the sub-band 1 in a human ear filter is approximately 170 Hz, which is far less than 500 Hz. The 180 wavelet signals are redundant to some extent. According to the foregoing description, removing a part of the 180 wavelet signals may effectively reduce complexity of subsequent procedures.

Therefore, selection of wavelet signals is optimized in this embodiment of the present invention, and 144 wavelet signals are finally determined, which are distributed as follows: when k<=16, four wavelet signals, that is, i={1, 2, 3, 4} with a maximum frequency range of 125 Hz are selected; when 17<=k<=20, five wavelet signals, that is, i={1, 2, ... 5} with a maximum frequency range of 250 Hz are selected; and when 21<=k<=30, all six wavelet signals, that is, i={1, 2, ... 6} with a maximum frequency range of 500 Hz are selected.

Then, referring to Formula 2, for a wavelet signal on a $k^{th}$ sub-band, an average energy of the wavelet signal is calculated according to a value of i.

Feature vectors of the 144 wavelet signals are combined to obtain a 144-dimensional feature vector.

The 144-dimensional feature vector or the 180-dimensional feature vector may serve as an input in subsequent S74.

S74. Perform distortion calculation according to the foregoing feature vector to obtain a distortion degree.

As the prior art, after the feature vector is obtained, a related machine learning tool is introduced in the present invention to output a distortion degree between 0 and 1. Generally, the distortion degree, as a test result, is between 0 and 1; and 0 indicates no distortion, and 1 indicates maximum distortion.

S75. Obtain a voice quality evaluation result according to the foregoing distortion degree.

According to the distortion degree obtained by means of calculation, where the distortion degree is represented by X, after linear transformation of Y=−4.0*X+5.0, a voice quality evaluation result Y, that is, MOS-LQO may be obtained. A score range of the MOS-LQO is from 1 to 5.

In a practical application, the foregoing voice signal is a voice signal frame in a preferable embodiment, a voice signal whose frame length is 64 milliseconds (ms) is used as an example, and the foregoing procedures from S71 to S73 are performed on each frame to obtain a voice quality evaluation result of a current frame. A segment of a voice signal may occupy, for example, a few seconds or one minute, efficiency can be improved by segmenting the voice signal by frame, and a more accurate quality evaluation result can be obtained.

Further, the foregoing embodiment may further include the following steps: calculating an average value of the voice quality evaluation result of the voice signal and at least one voice quality evaluation result of a historical voice signal, to obtain a comprehensive voice quality evaluation result, where the historical voice signal is a voice signal prior to the voice signal, and each historical voice signal has same duration as the voice signal; and for a voice signal that includes several frames, calculating an average value of distortion degrees of all the frames, and using the average value as an average distortion degree of the voice signal.

According to the method for evaluating voice quality provided in this embodiment of the present invention, a voice quality evaluation result with relatively high accuracy is finally obtained by performing human auditory modeling processing, then converting a to-be-detected signal into a wavelet signal by means of wavelet transform, where the wavelet signal represents a time-frequency signal of variable resolution, further analyzing the wavelet signal, extracting feature corresponding to the signal, combining the extracted feature into a multi-dimensional vector, which is also called as a feature, and performing further calculation on the feature vector.

The following describes Embodiment 4 of the present invention, where a sampling rate of a voice signal is 8 KHz. A difference from the foregoing Embodiment 3 in which the sampling rate of the voice signal is 16 KHz includes the following content.

Figure 11:
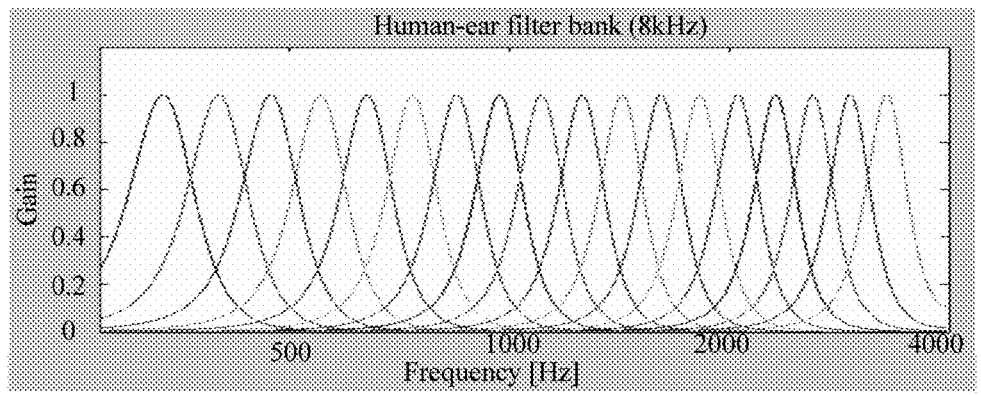
FIG. 11 is a schematic diagram of a signal that has a sampling rate of 8 KHz and on which band-pass filtering is performed by a human-ear filter bank according to Embodiment 4 of the present invention.

FIG. 11 is a schematic diagram of a signal that has a sampling rate of 8 KHz and on which band-pass filtering is performed by a human-ear filter bank according to Embodiment 4 of the present invention. A range of a voice signal before band-pass filtering is from 0 to 4,000 Hz. As an example of a human-ear filter bank, for a voice signal that has a sampling rate of 8 KHz, a filter bank that has 18 sub-bands may be defined.

Referring to FIG. 11, for a voice signal that has a sampling rate of 8 KHz, filtering may be performed on the voice signal to obtain 18 sub-band signals, and in this case, N=18. For a procedure of calculating a temporal envelope of each sub-band signal, reference may be made to Formula 1, which is omitted herein.

Figure 10B:
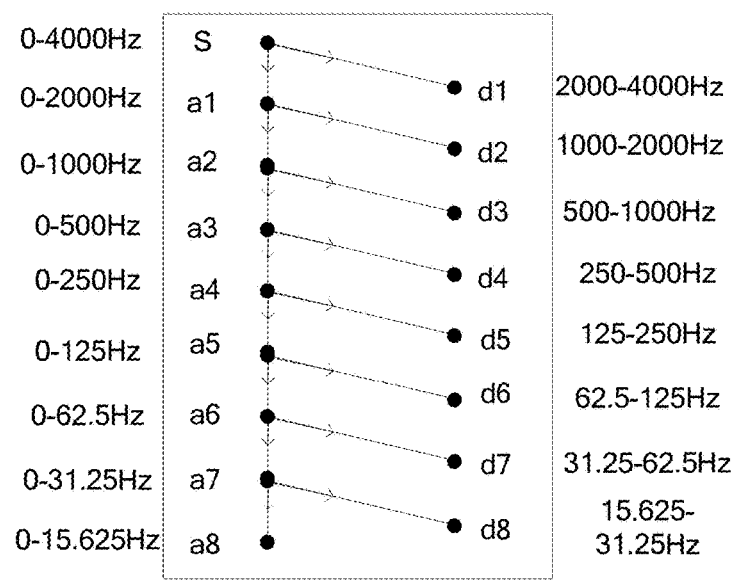

Discrete wavelet transform is performed on the temporal envelope of each sub-band signal for feature extraction. It should be noted that, for a sampling rate of 8 KHz, a range of a voice signal before band-pass filtering is from 0 to 4000 Hz. If a required frequency resolution remains from 0 to 15.625 Hz, referring to FIG. 10B, only 8-level wavelet transform needs to be performed. FIG. 10B shows a schematic band-pass range of discrete wavelet transform for a voice signal that is sampled at 8 KHz. In this case, L=8, processing is performed one level less than processing for the sampling rate of 16 KHz involved in the embodiment.

For a temporal envelope $\varphi_k(n)$ of a $k^{th}$ sub-band, a wavelet signal of the temporal envelope is extracted. According to step S73, during the discrete wavelet transform, decomposition may be performed level by level by using an iterative QMF filter bank. After each decomposition, two obtained sub-signals are an estimated part and a detail part, and each part occupies 50% of a bandwidth. A specific step is as follows.

A wavelet signal related to a range of 0 to 15.625 Hz may be precisely obtained by means of 8-level decomposition.

By analogy, wavelet signals within frequency ranges of 15.625 to 31.25, 62.5 to 125 Hz, and the like may be obtained.

Since the sampling rate of the voice signal is 8 KHz, according to related psychoacoustic analysis, preferably, a frequency analysis range that is set in quality evaluation and analysis is set to 0 to 250 Hz. Only a wavelet signal with a maximum frequency range of 250 Hz is collected. Referring to FIG. 10B, there are five wavelet signals in total, such as a8, d8, d7, d6, and d5. In this case, M=5. For a $k^{th}$ sub-band, wavelet functions corresponding to a8, d8, d7, d6, and d5 are named as $w_k^{(1)}(n)$, $w_k^{(2)}(n)$, $w_k^{(3)}(n)$, $w_k^{(4)}(n)$, and $w_k^{(5)}(n)$ respectively. For 18 sub-bands and 90 wavelet signals in total, the foregoing wavelet signals are a second signal.

For a wavelet signal on the $k^{th}$ sub-band $W_k^{(i)}(n)$, k=1, 2, ... 18, i={1, 2, ... 5}, Referring to Formula 2, an average energy of the wavelet signal is calculated.

Feature vectors of the 90 wavelet signals are combined to obtain a 90-dimensional feature vector.

Referring to the foregoing embodiment in which the sampling rate of the voice signal is 16 KHz, the 90 wavelet signals are redundant to some extent, removing a part of the 90 wavelet signals may effectively reduce complexity of subsequent procedures. Being similar to the foregoing embodiment in which the sampling rate of the voice signal is 16 KHz, some wavelet signals may be preferably selected from the 90 wavelet signals, and feature vectors of the preferably selected wavelet signals are combined, so that a feature vector may be obtained.

Selection of wavelet signals is optimized in this embodiment of the present invention, and 74 wavelet signals are finally determined, which are distributed as follows: when k<=16, four wavelet signals, that is, i={1, 2, 3, 4} with a maximum frequency range of 125 Hz are selected; and when 17<=k<=18, five wavelet signals, that is, i={1, 2, ... 5} with a maximum frequency range of 250 Hz are selected.

Then, referring to Formula 2, for a wavelet signal on a $k^{th}$ sub-band, an average energy of the wavelet signal is calculated according to a value of i, so as to finally obtain a 74-dimensional feature vector.

The foregoing 74-dimensional feature vector or the 90-dimensional feature vector may serve as an input of subsequent S74, but calculation complexity of the former is less than that of the latter. For subsequent processing, reference is made to step S74 and step S75, and for brevity, details are not described herein again.

According to the method for evaluating voice quality provided in this embodiment of the present invention, a voice quality evaluation result with relatively high accuracy is finally obtained by performing human auditory modeling processing, then converting a to-be-detected signal into a wavelet signal by means of wavelet transform, where the wavelet signal represents a time-frequency signal of variable resolution, further analyzing the wavelet signal, extracting feature corresponding to the signal, combining the extracted feature into a multi-dimensional vector, which is also called as a feature, and performing further calculation on the feature vector.

In addition, according to the method provided in this embodiment of the present invention, by means of band-pass filtering of human auditory modeling processing and performing multi-level wavelet transform on each of obtained multiple sub-band signals, a voice quality evaluation of a voice signal of multiple sampling rates may be supported, including a conventional sampling rate of 8 KHz; and in addition, a sampling rate of 16 KHz and higher sampling rates, such as 32 KHz, 44.1 KHz and 48 KHz, emerging with the development of technologies may further be supported. By setting the number of human ear filter channels and a required frequency resolution and frequency analysis range, although the number of sub-bands in a processing process, the number of wavelet transform levels, and the number of wavelet signals obtained after the transform may vary, the method for evaluating voice signal in this embodiment of the present invention may still be implemented.

However, in practical communication, an input voice signal may be a voice signal of a conventional 8 KHz sampling rate, a voice signal of a 16 KHz sampling rate, or a voice signal of another sampling rate. If a method for evaluating voice quality needs to support a voice signal of multiple sampling rate, after resampling processing is performed on an input voice signal of various sampling rates, the sampling rates may be transformed into sampling rates that are applicable to the method, and then pre-processing is performed, for example, after a voice signal frame is divided into frames with equal lengths, subsequent human auditory modeling processing is performed. An embodiment for implementing the method is Embodiment 5 of the present invention.

A current method for evaluating voice quality of an input voice signal with a sampling rate of 16 KHz is used as an example. If a sampling rate of an input voice signal is still 16 KHz, a procedure is consistent with that in Embodiment 3. If an input voice signal is 8 KHz, upsampling whose factor is 2 is performed first, a sampling rate is changed to 16 KHz, and the procedure in Embodiment 3 is executed. In this way, according to Embodiment 5, a unified architecture may be used, and a quality evaluation of a voice signal of different sampling rates such as a conventional sampling rate of 8 KHz and a sampling rate of 16 KHz may be supported.

In Embodiment 5 of the present invention, in a case of one human-ear filter bank, a voice quality evaluation of a voice signal of different sampling rates may be implemented by only maintaining one group of hardware-designed filtering channels. The foregoing quality evaluation method for supporting an input signal of multiple sampling rates is easy to implement, and a cost of hardware implementation may be reduced.

However, there are also some disadvantages in Embodiment 5. For example, a quality evaluation may be performed on an 8 KHz voice signal after upsampling is performed. However, among the signal after upsampling, a voice signal from 4 KHz to 8 KHz has no useful information. It is not proper to use many useless frequency ranges for feature extraction, which causes a waste of processing resources. Therefore, in Embodiment 6 of the present invention, it is suggested that multiple human-ear filter banks such as the multiple human-ear filter banks shown in FIG. 8 and FIG. 11 may be simultaneously reserved, that is, multiple evaluation systems that support different sampling rate such as 8 KHz and 16 KHz simultaneously exist. If a sampling rate of an input voice signal is 16 KHz, a voice quality evaluation procedure is consistent with that in Embodiment 3; and if a sampling rate of an input voice signal is 8 KHz, the voice quality evaluation procedure is consistent with that in Embodiment 4.

In Embodiment 6 of the present invention, a voice quality evaluation of a voice signal of different sampling rates may be implemented in a case in which multiple human-ear filter banks exist. Although a hardware cost is incurred in implementing the foregoing quality evaluation method that is used to support an input signal of various sampling rates, a processing speed of a voice quality evaluation can be improved.

Figure 12:
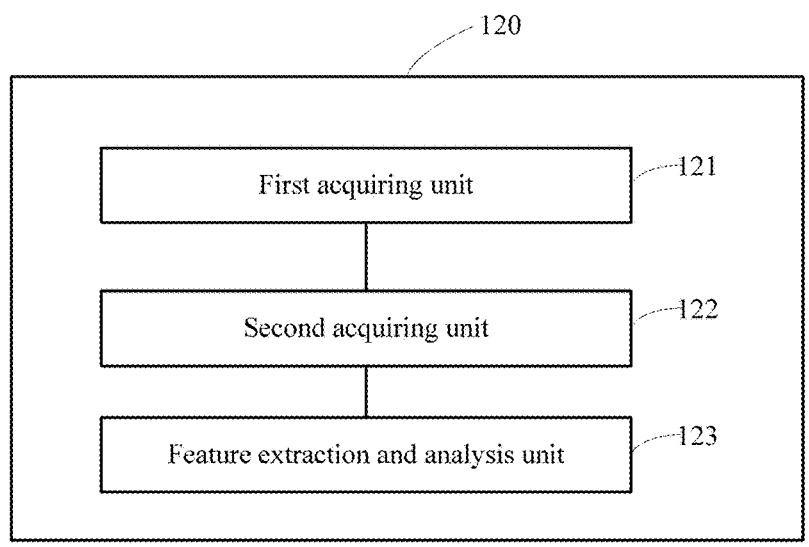
FIG. 12 is a schematic block diagram of an apparatus for evaluating voice quality according to Embodiment 7 of the present invention.

FIG. 12 is a schematic block diagram of an apparatus 120 for evaluating voice quality according to Embodiment 7 of the present invention. The apparatus 120 includes a first acquiring unit 121, a second acquiring unit 122, and a feature extraction and analysis unit 123.

The first acquiring unit 121 performs human auditory modeling processing on a voice signal to obtain a first signal, and sends the first signal to the second acquiring unit.

The second acquiring unit 122 receives the first signal sent by the first acquiring unit, performs variable resolution time-frequency analysis on the first signal to obtain a second signal, and sends the second signal to the feature extraction and analysis unit.

The feature extraction and analysis unit 123 receives the second signal sent by the second acquiring unit, and performs, based on the second signal, feature extraction and analysis to acquire a voice quality evaluation result of the voice signal.

The apparatus 120 may implement the method for evaluating voice quality in Embodiment 1, and for brevity, for specific details, reference is made to the description in Embodiment 1, which is not described herein again.

According to the apparatus for evaluating voice quality provided in this embodiment of the present invention, a voice quality evaluation result with relatively high accuracy is finally obtained by performing human auditory modeling processing, then converting a to-be-detected signal into a multi-resolution signal, further analyzing the time-frequency signal of variable resolution, extracting a feature corresponding to the signal, and performing further analysis.

Figure 13:
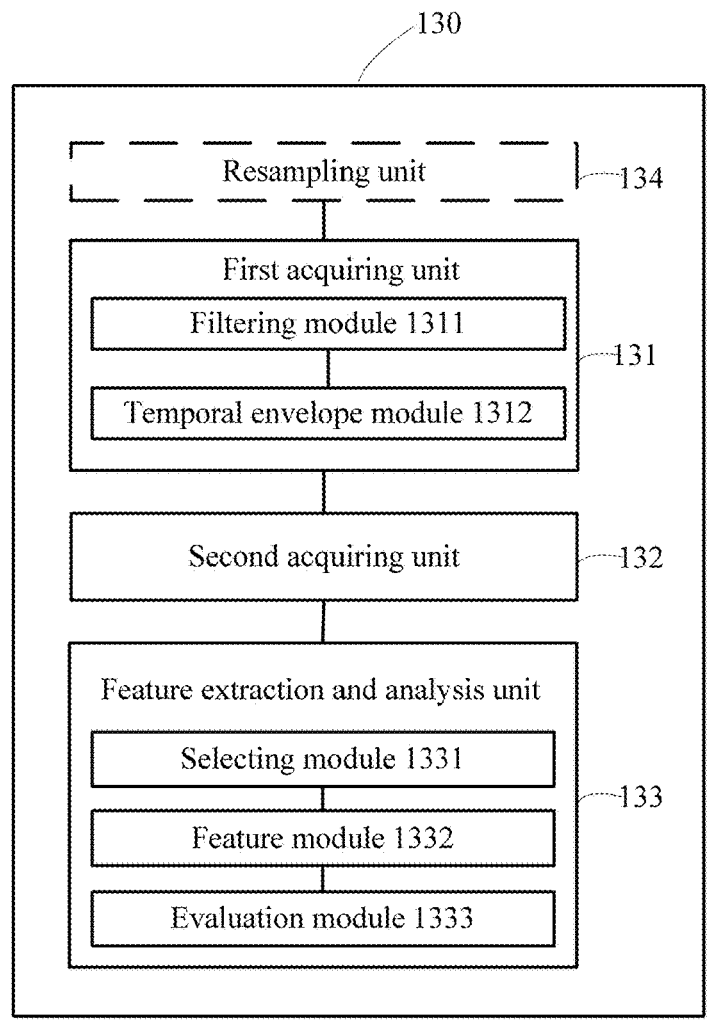
FIG. 13 is a schematic block diagram of an apparatus for evaluating voice quality according to Embodiment 8 of the present invention.

FIG. 13 is a schematic block diagram of an apparatus 130 for evaluating voice quality according to Embodiment 8 of the present invention. Being similar to or the same as the apparatus 120, the apparatus 130 includes a first acquiring unit 131, a second acquiring unit 132, and a feature extraction and analysis unit 133. In addition, a difference from the apparatus 120 is that, the apparatus 130 may further include a resampling unit 134.

The first acquiring unit 131 performs human auditory modeling processing on a voice signal to obtain a first signal, and sends the first signal to the second acquiring unit.

The second acquiring unit 132 receives the first signal sent by the first acquiring unit, performs variable resolution time-frequency analysis on the first signal to obtain a second signal, and sends the second signal to the feature extraction and analysis unit.

The feature extraction and analysis unit 133 receives the second signal sent by the second acquiring unit, and performs, based on the second signal, feature extraction and analysis to acquire a voice quality evaluation result of the voice signal.

In addition, optionally, the first acquiring unit 131 includes a filtering module 1311 and a temporal envelope module 1312.

The filtering module 1311 makes the voice signal pass through a band-pass filter bank that conforms to a human auditory feature, to acquire N sub-band signals, and send the N sub-band signals to the temporal envelope module, where N is the number of band-pass filter channels and is a positive integer.

The temporal envelope module 1312 receives the N sub-band signals sent by the filtering module, and calculate a temporal envelope of each sub-band signal to obtain the first signal.

The second acquiring unit 132 is configured to perform L-order discrete wavelet transform on each first signal, and select, from wavelet signals obtained by means of the L-order discrete wavelet transform, M wavelet signals as the second signal, where L and M are each a positive integer, a value of L is determined based on a sampling rate of the voice signal and a frequency resolution that is required for quality evaluation and analysis, and a value of M is determined according to L and a frequency analysis range that is set during the quality evaluation and analysis.

Optionally, as a different embodiment, when the sampling rate of the voice signal is 16 KHz, the frequency resolution is from 0 to 15.625 Hz, and the set frequency analysis range is from 0 to 500 Hz, the second acquiring unit 132 performs 9-order discrete wavelet transform on each first signal, and selects, from wavelet signals obtained from each first signal, six wavelet signals as the second signal; or optionally, as a different embodiment, when the sampling rate of the voice signal is 8 KHz, the frequency resolution is from 0 to 15.625 Hz, and the set frequency analysis range is from 0 to 250 Hz, the second acquiring unit 132 performs 8-order discrete wavelet transform on each first signal, and selects, from wavelet signals obtained from each first signal, five wavelet signals as the second signal.

Optionally, as a different embodiment, the feature extraction and analysis unit 133 may include a selecting module 1331, where the selecting module 1331 selects, after M*N wavelet signals of the N sub-band signals are obtained, all or multiple wavelet signals from the M*N wavelet signals for feature extraction and analysis, where N is a positive integer.

Optionally, when N=30, the selecting module 1331 may select the following multiple wavelet signals: when k<=16, select four wavelet signals with a maximum frequency range of 125 Hz; when 17<=k<=20, select five wavelet signals with a maximum frequency range of 250 Hz; and when 21<=k<=30, select all six wavelet signals with a maximum frequency range of 500 Hz.

Optionally, when N=18, the selecting module 1331 may select the following multiple wavelet signals: when k<=16, select four wavelet signals with a maximum frequency range of 125 Hz; and when 17<=k<=18, select five wavelet signals with a maximum frequency range of 250 Hz.

In addition, optionally, the feature extraction and analysis unit 133 may further include a feature module 1332 and an evaluation module 1333.

The feature module 1332 calculates an average energy of each wavelet signal in the second signal and uses the average energy as a feature, and sends the feature vector to a evaluation module.

The evaluation module 1333 receives the feature vector sent by the feature module, combines all features into a multi-dimensional feature vector, and obtains the voice quality evaluation result of the voice signal after distortion detection and quality prediction are performed on the feature vector.

The evaluation module 1333 is further configured to calculate an average value of the voice quality evaluation result of the voice signal and at least one voice quality evaluation result of a previous voice signal, to obtain a comprehensive voice quality evaluation result.

Optionally, in a different embodiment, the apparatus 130 may further include a resampling unit 134. The resampling unit 134 performs resampling processing on a voice signal of various sampling rates to obtain a voice signal of a same sampling rate. In this way, no hardware cost is increased in a case in which one filtering module is maintained, and a voice signal of different sampling rates may be processed while a voice quality evaluation result with relatively high accuracy is obtained.

Optionally, in a different embodiment, there may be multiple filtering modules 1311 of the first acquiring unit 131 of the apparatus 130, which separately perform filtering on an input voice signal of different sampling rates, send sub-band signals obtained after filtering to the temporal envelope module 1312 for subsequent processing. In subsequent processing, the number of sub-band signals in a processing process, the number of wavelet transform levels, and the number of wavelet signals obtained after the transform may vary because of a required frequency resolution and frequency analysis range. In this way, a processing speed of processing a voice signal of different sampling rates can be improved while a voice quality evaluation result with relatively high accuracy is obtained.

The apparatus 130 may implement any method for evaluating voice quality in Embodiments 1 to 6 of the present invention, and for brevity, for specific details, reference is made to the descriptions in Embodiments 1 to 6, which are not described herein again.

According to the apparatus for evaluating voice quality provided in this embodiment of the present invention, a voice quality evaluation result with relatively high accuracy is finally obtained by performing human auditory modeling processing, then converting a to-be-detected signal into a wavelet signal by means of a wavelet transform, where the wavelet signal represents a time-frequency signal of variable resolution, further analyzing the wavelet signal, extracting feature corresponding to the signal, combining the extracted feature into a multi-dimensional vector, which is also called as a feature, and performing further calculation on the feature vector.

Figure 14:
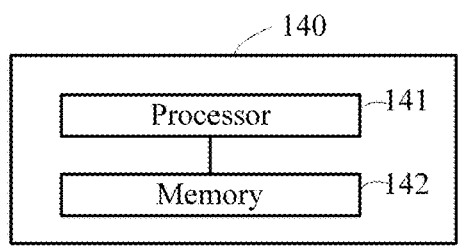
FIG. 14 is a schematic block diagram of an apparatus for evaluating voice quality according to Embodiment 9 of the present invention.

FIG. 14 is a schematic block diagram of an apparatus 140 for evaluating voice quality according to Embodiment 9 of the present invention. The apparatus 140 includes a processor 141 and a memory 142. The processor 141 and the memory 142 are connected by using a bus system.

The memory 142 is configured to store instructions that enable the processor 141 to execute the following operations: performing human auditory modeling processing on a voice signal to obtain a first signal; performing variable resolution time-frequency analysis on the first signal to obtain a second signal; and performing, based on the second signal, feature extraction and analysis to obtain a voice quality evaluation result of the voice signal.

According to the foregoing technical solutions, a voice quality evaluation result with relatively high accuracy is finally obtained by performing human auditory modeling processing, then converting a to-be-detected signal into a multi-resolution signal, further analyzing the time-frequency signal of variable resolution, extracting a feature corresponding to the signal, and performing further analysis.

The processor 141 may also be referred to as a central processing unit (CPU). The memory 142 may include a read-only memory (ROM) and a random access memory (RAM), and provides an instruction and data for the processor 141. The memory 142 may further include a non-volatile random access memory (NVRAM).

The methods disclosed in the foregoing embodiments of the present invention may be applied to the processor 141, or implemented by the processor 141. The processor 141 may be an integrated circuit chip and has a signal processing capability. In an implementation process, the steps in the foregoing method may be completed by using an integrated logic circuit of hardware or an instruction in a form of software in the processor 141. The foregoing processor 141 may be a general processor, a digital signal processor (DSP), an application-specific integrated circuit (ASIC), a field programmable gate array (FPGA) or another programmable logic component, a discrete gate or a transistor logic component, or a discrete hardware component. The methods, the steps, and the logical block diagrams disclosed in the embodiments of the present invention may be implemented or performed. A general processor may be a microprocessor or the processor may be any conventional processor, and the like. The steps of the methods disclosed in the embodiments of the present invention may be directly performed by a hardware decoding processor, or performed by a combination of hardware and software modules in a decoding processor. The software module may be located in a mature storage medium in the field, such as a RAM, a flash memory, a ROM, a programmable read-only memory, an electrically-erasable programmable memory or a register. The storage medium is located in the memory 142. The processor 141 reads information from the memory 142, and completes the steps of the foregoing methods in combination with the hardware.

Optionally, the processor 141 makes the voice signal pass through a band-pass filter bank that conforms to a human auditory feature, to acquire N sub-band signals, where N is the number of band-pass filter channels and is a positive integer; and calculates a temporal envelope of each sub-band signal to obtain the first signal.

Optionally, the processor 141 performs L-order discrete wavelet transform on each first signal, and selects, from wavelet signals obtained by means of the L-order discrete wavelet transform, M wavelet signals as the second signal, where L and M are each a positive integer, a value of L is determined based on a sampling rate of the voice signal and a frequency resolution that is required for quality evaluation and analysis, and a value of M is determined according to L and a frequency analysis range that is set during the quality evaluation and analysis.

Optionally, as a different embodiment, when the sampling rate of the voice signal is 16 KHz, the frequency resolution is from 0 to 15.625 Hz, and the set frequency analysis range is from 0 to 500 Hz, the processor 141 performs 9-order discrete wavelet transform on each first signal, and selects, from wavelet signals obtained from each first signal, six wavelet signals as the second signal; or optionally, as a different embodiment, when the sampling rate of the voice signal is 8 KHz, the frequency resolution is from 0 to 15.625 Hz, and the set frequency analysis range is from 0 to 250 Hz, the processor 141 performs 8-order discrete wavelet transform on each first signal, and selects, from wavelet signals obtained from each first signal, five wavelet signals as the second signal.

Optionally, after M*N wavelet signals of the N sub-band signals are obtained, the processor 141 selects all or multiple wavelet signals from the M*N wavelet signals for feature extraction and analysis, where N is a positive integer.

Optionally, when N=30, the multiple wavelet signals selected by the processor 141 include the following wavelet signals: when $k<=16$, four wavelet signals with a maximum frequency range of 125 Hz are selected; and when $17<=k<=20$, five wavelet signals with a maximum frequency range of 250 Hz are selected; and when $21<=k<=30$, all six wavelet signals with a maximum frequency range of 500 Hz are selected.

Optionally, when N=18, the multiple wavelet signals selected by the processor 141 include the following wavelet signals: when $k<=16$, four wavelet signals with a maximum frequency range of 125 Hz are selected; and when $17<=k<=18$, five wavelet signals with a maximum frequency range of 250 Hz are selected.

Optionally, the processor 141 calculates an average energy of each wavelet signal in the second signal and uses the average energy as a feature, combines all features into a multi-dimensional feature vector, and obtains the voice quality evaluation result of the voice signal after distortion detection and quality prediction are performed on the feature vector.

Optionally, the processor 141 further calculates an average value of the voice quality evaluation result of the voice signal and at least one voice quality evaluation result of a previous voice signal, to obtain a comprehensive voice quality evaluation result.

Optionally, the processor 141 performs resampling processing on a voice signal of various sampling rates to obtain a voice signal of a same sampling rate. In this way, no hardware cost is increased in a case in which a filter bank remains unchanged, and a voice signal of different sampling rates may be processed while a voice quality evaluation result with relatively high accuracy is obtained.

Optionally, in a different embodiment, the processor 141 may use multiple filter banks, where the multiple filter banks separately perform filtering on an input voice signal of different sampling rates, and then the processor 141 sends sub-band signals obtained after filtering to a temporal envelope module for subsequent processing. In subsequent processing, the number of sub-band signals in a processing process, the number of wavelet transform levels, and the number of wavelet signals obtained after the transform may vary because of a required frequency resolution and frequency analysis range. In this way, a processing speed of processing a voice signal of different sampling rates can be improved while a voice quality evaluation result with relatively high accuracy is obtained.

The apparatus 140 may implement any method for evaluating voice quality in Embodiments 1 to 6 of the present invention, and for brevity, for specific details, reference is made to the descriptions in Embodiments 1 to 6, which are not described herein again.

A person of ordinary skill in the art may be aware that, in combination with the examples described in the embodiments disclosed in this specification, units and algorithm steps may be implemented by electronic hardware, computer software, or a combination thereof. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, which are not described herein again.

In the several embodiments provided in the present application, it should be understood that the disclosed system, apparatus, and method may be implemented in other manners. For example, the described apparatus embodiment is merely exemplary. For example, the unit division is merely a logical function division and there may be other divisions in the actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention is subject to the protection scope of the claims.

What is claimed is:

1. A method for evaluating voice quality, comprising:
performing human auditory modeling processing on a voice signal to obtain first signals, the human auditory modeling processing comprising passing the voice signal through a human-ear filter bank, the human-ear filter bank performing non-uniform band division of the voice signal and generating sub-band signals with different frequency ranges, and the sub-band signals being processed to generate the first signals;
performing variable resolution time-frequency analysis on the first signals to obtain second signals, the variable resolution time-frequency analysis comprising performing L-order wavelet transformation on the first signals to obtain M wavelet signals, each of L and M comprising a positive integer, a value of L being determined based on a sampling rate of the voice signal and a frequency resolution that is required for quality evaluation and analysis, and a value of M being determined according to L and a frequency analysis range that is set during the quality evaluation and analysis;
performing, based on the second signals, feature extraction and analysis to obtain a voice quality evaluation result of the voice signal and a distortion degree;
generating a comprehensive voice quality evaluation result by calculating an average value of the voice quality evaluation result of the voice signal and at least one voice quality evaluation result of a previous voice signal;
generating a mean opinion score-listening quality objective (MOS-LQO) score by linearly transforming the distortion degree;
improving the voice quality at a terminal of a network using the comprehensive voice quality evaluation result and the MOS-LQO score to identify a quality bottleneck in the network; and
performing resampling processing on a voice signal of various sampling rates to obtain the voice signal of a same sampling rate before performing the human auditory modeling processing.

2. The method of claim 1, wherein performing the human auditory modeling processing on the voice signal to obtain the first signals comprises:
making the voice signal pass through a band-pass filter bank that conforms to a human auditory feature, to acquire N sub-band signals, N comprising the number of band-pass filter channels and comprising a positive integer; and
calculating a temporal envelope of each sub-band signal to obtain the first signals.

3. The method of claim 1, wherein performing the L-order discrete wavelet transform to obtain the M wavelet signals comprises:
when the sampling rate of the voice signal is 16 kilohertz (KHz), the frequency resolution is from 0 to 15.625 hertz (Hz), and the set frequency analysis range is from 0 to 500 Hz, performing 9-order discrete wavelet transform on each first signal, and selecting, from wavelet signals obtained from each first signal, six wavelet signals as the second signal; and
when the sampling rate of the voice signal is 8 KHz, the frequency resolution is from 0 to 15.625 Hz, and the set frequency analysis range is from 0 to 250 Hz, performing 8-order discrete wavelet transform on each first signal, and selecting, from wavelet signals obtained from each first signal, five wavelet signals as the second signal.

4. The method of claim 3, wherein performing, based on the second signal, feature extraction and analysis comprises selecting all or multiple wavelet signals from the M*N wavelet signals for feature extraction and analysis after M*N wavelet signals of the N sub-band signals are obtained, N comprising a positive integer.

5. The method of claim 4, wherein when N=30 and multiple wavelet signals are selected from the M*N wavelet signals for feature extraction and analysis, the multiple wavelet signals are the following wavelet signals of a $K^{th}$ sub-band of the N sub-bands:
four wavelet signals with a maximum frequency range of 125 Hz are selected when k<=16;
five wavelet signals with a maximum frequency range of 250 Hz are selected when 17<=k<=20; and
all six wavelet signals with a maximum frequency range of 500 Hz are selected when 21<=k<=30.

6. The method of claim 4, wherein when N=18 and multiple wavelet signals are selected from the M*N wavelet signals for feature extraction and analysis, the multiple wavelet signals comprise the following wavelet signals of a $K^{th}$ sub-band of the following N sub-bands:
four wavelet signals with a maximum frequency range of 125 Hz are selected when k<=16; and
five wavelet signals with a maximum frequency range of 250 Hz are selected when 17<=k<=18.

7. The method of claim 1, wherein the human-ear filter bank comprises a Gammatone filter bank, and the method further comprises removing a portion of the wavelet signals to generate the second signals.

8. The method of claim 1, wherein performing, based on the second signals, feature extraction and analysis to obtain the voice quality evaluation result comprises:
calculating an average energy of each wavelet signal in the second signals;
using the average energy as a feature;
combining all the features into a multi-dimensional feature vector; and
obtaining the voice quality evaluation result of the voice signal after distortion detection and quality prediction are performed on the feature vector.

9. An apparatus for evaluating voice quality, comprising:
a non-transitory computer readable medium having instructions stored thereon; and
a computer processor coupled to the non-transitory computer readable medium and configured to execute the instructions to:
perform human auditory modeling processing on a voice signal to obtain first signals, the human auditory modeling processing comprising passing the voice signal through a human-ear filter bank, the human-ear filter bank performing non-uniform band division of the voice signal and generating sub-band signals with different frequency ranges, and the sub-band signals being processed to generate the first signals;
perform variable resolution time-frequency analysis on the first signals to obtain second signals, the variable resolution time-frequency analysis comprising performing L-order wavelet transformation on the first signals to obtain M wavelet signals, each of L and M comprising a positive integer, a value of L being determined based on a sampling rate of the voice signal and a frequency resolution that is required for quality evaluation and analysis, and a value of M being determined according to L and a frequency analysis range that is set during the quality evaluation and analysis;
perform, based on the second signals, feature extraction and analysis to obtain a voice quality evaluation result of the voice signal and a distortion degree;
generate a comprehensive voice quality evaluation result by calculating an average value of the voice quality evaluation result of the voice signal and at least one voice quality evaluation result of a previous voice signal;
generate a mean opinion score-listening quality objective (MOS-LQO) score by linearly transforming the distortion degree;
improve the voice quality at a terminal of a network using the comprehensive voice quality evaluation result and the MOS-LQO score to identify a quality bottleneck in the network; and
perform resampling processing on a voice signal of various sampling rates to obtain the voice signal of a same sampling rate before performing the human auditory modeling processing.

10. The apparatus of claim 9, wherein the computer processor is further configured to execute the instructions to:
make the voice signal pass through a band-pass filter bank that conforms to a human auditory feature, to acquire N sub-band signals, N comprising the number of band-pass filter channels and comprising a positive integer; and
calculate a temporal envelope of each sub-band signal to obtain the first signals.

11. The apparatus of claim 9, wherein the computer processor is further configured to execute the instructions to:
when the sampling rate of the voice signal is 16 kilohertz (KHz), the frequency resolution is from 0 to 15.625 hertz (Hz), and the set frequency analysis range is from 0 to 500 Hz, perform 9-order discrete wavelet transform on each first signal, and select, from wavelet signals obtained from each first signal, six wavelet signals as the second signal; and
when the sampling rate of the voice signal is 8 KHz, the frequency resolution is from 0 to 15.625 Hz, and the set frequency analysis range is from 0 to 250 Hz, perform 8-order discrete wavelet transform on each first signal, and select, from wavelet signals obtained from each first signal, five wavelet signals as the second signal.

12. The apparatus of claim 11, wherein the computer processor is further configured to execute the instructions to, after M*N wavelet signals of the N sub-band signals are obtained, select all or multiple wavelet signals from the M*N wavelet signals for feature extraction and analysis, N comprising a positive integer.

13. The apparatus of claim 12, wherein when N=30, the computer processor is further configured to execute the instructions to select the following multiple wavelet signals:
select four wavelet signals with a maximum frequency range of 125 Hz when k<=16;
select five wavelet signals with a maximum frequency range of 250 Hz when 17<=k<=20; and
select all six wavelet signals with a maximum frequency range of 500 Hz when 21<=k<=30.

14. The apparatus of claim 12, wherein when N=18, the computer processor is further configured to execute the instructions to select the following multiple wavelet signals:
select four wavelet signals with a maximum frequency range of 125 Hz when k<=16; and
select five wavelet signals with a maximum frequency range of 250 Hz when 17<=k<=18.

15. The apparatus of claim 9, wherein the computer processor is further configured to execute the instructions to:
calculate an average energy of each wavelet signal in the second signals and use the average energy as a feature;
combine all the features into a multi-dimensional feature vector; and
obtain the voice quality evaluation result of the voice signal after distortion detection and quality prediction are performed on the feature vector.

16. The apparatus of claim 9, wherein the human-ear filter bank comprises a Gammatone filter bank, and the computer processor is further configured to execute the instructions to remove a portion of the wavelet signals to generate the second signals.

* * * * *